United States Patent
Akiyama (12)
(10) Patent No.: US 6,542,208 B1
(45) Date of Patent: Apr. 1, 2003

(54) LIQUID CRYSTAL DISPLAY DEVICE

(75) Inventor: Takashi Akiyama, Sayama (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 09/645,520

(22) Filed: Aug. 25, 2000

(51) Int. Cl.$^7$ .......................................... G02F 1/1336
(52) U.S. Cl. ............................................. 349/96
(58) Field of Search ................................. 349/96

(56) References Cited

U.S. PATENT DOCUMENTS

| | | | |
|---|---|---|---|
| 6,181,399 B1 * | 1/2001 | Odoi et al. | 349/113 |
| 6,233,029 B1 * | 5/2001 | Iijima et al. | 349/96 |
| 6,400,432 B2 * | 6/2002 | Kuroiwa et al. | 349/96 |
| 6,480,248 B1 * | 11/2002 | Lee et al. | 349/96 |

* cited by examiner

*Primary Examiner*—James Dudek
(74) *Attorney, Agent, or Firm*—Armstrong, Westerman & Hattori, LLP (57) ABSTRACT

A liquid crystal display device (1) which can display information on both surfaces is structured: by respectively disposing reflection-type polarizing films (8, 9) which transmit a linearly polarized light in a direction parallel to a transmission axis and reflect a linearly polarized light in a direction orthogonal to the transmission axis on both sides of a liquid crystal cell (7) formed by sealing a liquid crystal layer (6) between a pair of two glass substrates (2, 3) with transparent electrodes (4, 5) formed on the opposed inner surfaces, while disposing absorption-type polarizing films (10, 11) respectively on both sides thereof, which transmit a linearly polarized light in a direction parallel to a transmission axis and absorb a linearly polarized light in a direction orthogonal to the transmission axis, and by disposing the reflection-type polarizing film and the absorption-type polarizing film (8) and (10), (9) and (11) which are disposed on the same side of the liquid crystal cell (7) so that the directions of these transmission axes almost correspond with each other.

12 Claims, 7 Drawing Sheets

PRIOR ART

LIQUID CRYSTAL DISPLAY DEVICE

BACKGROUND OF THE INVENTION

1. Field of the Invention

The present invention relates to a reflective-type liquid crystal display device which can display information on both surfaces.

2. Description of the Related Art

The characteristics of a conventional liquid crystal display device has been low power consumption, low profile and light weight, but in pursuing visibility and color reproducibility, it developed into a transmission-type liquid crystal display device provided with a back light, in which the original characteristics of the liquid crystal display device are not shown enough. However, with the rapid diffusion of a personal digital assistant recently, a reflective-type liquid crystal display device employed thereto is rapidly improving.

The most remarkable characteristic of the reflective-type liquid crystal display device is the low power consumption. Since most personal digital assistants are operated by batteries, the life of the battery influences the performance of the digital assistant. In the digital assistant like this, it is suitable to employ the liquid crystal display device, and particularly, the reflective-type liquid crystal display device which can reduce the power consumption to prolong the battery's life for several hours, since it does not use the back light.

Here, operations of a conventional liquid crystal display device will be briefly described with reference to FIG. 9.

Figure 9:
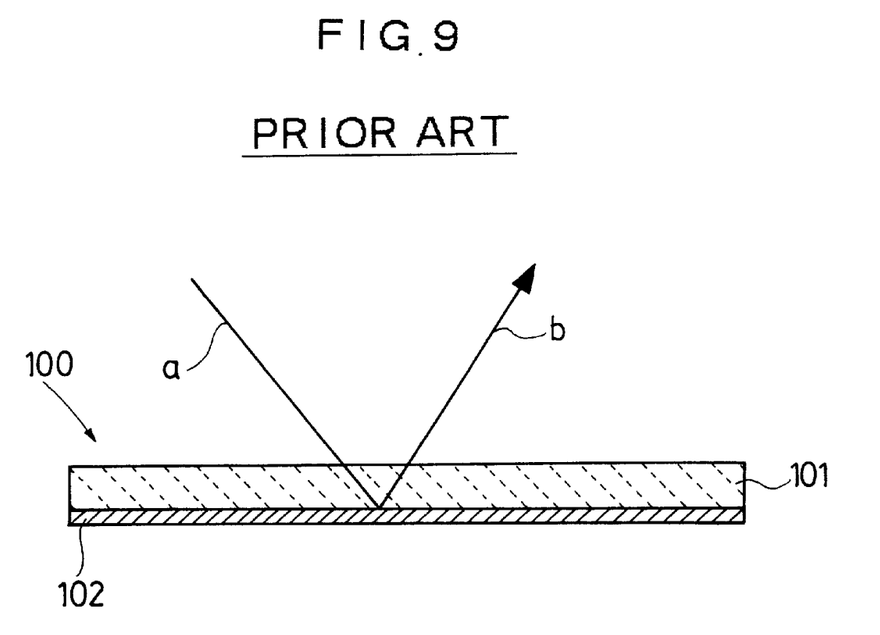
FIG. 9 is a sectional view schematically showing the structure of a conventional reflective-type liquid crystal display device.

A conventional reflective-type liquid crystal display device 100 shown in FIG. 9 is structured by disposing a reflector 102 on one surface side of a liquid crystal panel 101 (on the lower surface side in the drawing).

The liquid crystal panel 101 is structured by holding a liquid crystal layer between two transparent substrates with electrodes formed thereon, wherein a TN liquid crystal (twisted nematic liquid crystal) at a twist angle of 90 degrees or an STN liquid crystal (super twisted nematic liquid crystal) at a twist angle of 180 degrees to 270 degrees are often used as the liquid crystal layer. Polarizing films (not shown) are adhered to both sides of this liquid crystal panel 101. Each of the polarizing films is disposed so that the directions of these transmission axes correspond respectively with the alignment directions of the upper surface side and the lower surface side of the liquid crystal layer.

The reflector 102 has a structure in which a coating made of aluminum or silver is formed on a film and has a high reflectance.

Supposing that the liquid crystal panel 101 of this reflective-type liquid crystal display device 100 is disposed on the visible side. In this case, an incident light a is made incident from the visible side of the liquid crystal panel 101 to pass through the liquid crystal panel 101, and then reflected by the reflector 102 to become a reflection light b, returned to the visible side and emitted out. The liquid crystal panel 101 can display characters and the like by the contrast between reflection and non-reflection.

However, since the reflector 102 is disposed on one side of the liquid crystal panel 101 in the conventional reflective-type liquid crystal display device 100, the excellent display can be obtained when the liquid crystal panel 101 is disposed on the visible side, but when the reflector 102 is disposed on the visible side, it is impossible to view its display since the incident light is interrupted by the reflector 102 and cannot reach the liquid crystal panel 101.

This is the matter of course in the conventional reflective-type liquid crystal display device since the reflector 102 is provided on one surface side of the liquid crystal panel as described above, which has never been discussed before.

However, the reflective-type liquid crystal display device is advantageous in low power consumption, small size, light weight and low profile, which is most suitable for the display device of the personal digital assistant, but it is preferable to display information on both surfaces like a paper as being a candidate for the replacement of the paper in the age of paperless. Thus, the amount of displayed information per paper doubles, as well as the practical applications increase, whereby the liquid crystal display device becomes to have various uses.

As a means for displaying information on both surfaces in the conventional liquid crystal display device, it is possible to think of attaching two reflective-type liquid crystal display devices to each other. However, there arises problems that the cost is increased as two liquid crystal display devices are needed, its advantages of low-profile and light-weight are eroded, and power consumption doubles, with the result that the liquid crystal display device in the above design can not put into practical use.

SUMMARY OF THE INVENTION

The present invention is made to solve the aforementioned problems in a liquid crystal display device, and its object is to make it possible to display information on both surfaces of the liquid crystal display device, which can be viewed from both sides, and to satisfy the needs of low cost, low profile, light weight and low power consumption.

The liquid crystal display device of the present invention is comprised of a liquid crystal cell formed by sealing a liquid crystal layer between a pair of transparent substrates having electrodes respectively on opposed inner surfaces thereof, reflection-type polarizing films respectively disposed on both sides of the liquid crystal cell, for transmitting a linearly polarized light in a direction parallel to a transmission axis and reflecting a linearly polarized light in a direction orthogonal to the transmission axis, and absorption-type polarizing films respectively disposed outside the reflection-type polarizing films, for transmitting a linearly polarized light in a direction parallel to a transmission axis and absorbing a linearly polarized light in a direction orthogonal to the transmission axis.

It is preferable that the reflection-type polarizing film and the absorption-type polarizing film disposed on the same side of the liquid crystal cell are disposed so that the directions of the transmission axes thereof almost correspond with each other.

Further, it is preferable that a light scattering member is disposed at least one place between the liquid crystal cell and the reflection-type polarizing film on one surface side and between the liquid crystal cell and the reflection-type polarizing film on the other side.

Moreover, a super twisted nematic liquid crystal can be used as the liquid crystal layer of the liquid crystal cell. In this case, it is preferable that a retardation film is disposed on one surface side of the liquid crystal cell.

Furthermore, a twisted nematic liquid crystal can be used as the liquid crystal layer of the liquid crystal cell. Also, a ferroelectric liquid crystal can be used as the liquid crystal layer of the liquid crystal cell.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, preferred embodiments for carrying out a liquid crystal display device according to the present invention will be described in detail with reference to FIG. 1 to FIG. 8.

First Embodiment: FIG. 1 to FIG. 4

Figure 1:
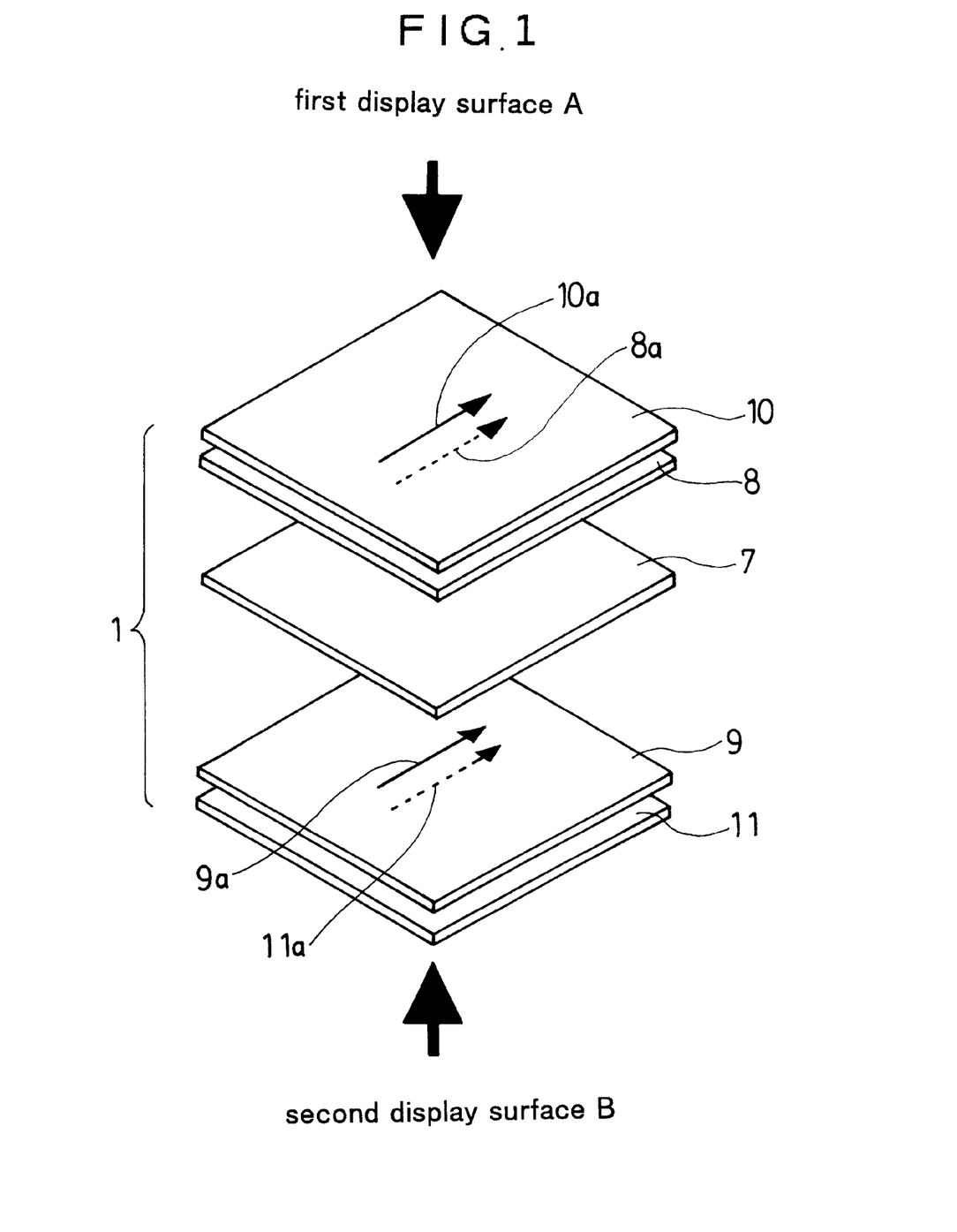
FIG. 1 is an exploded perspective view showing the structure of a first embodiment of a liquid crystal display device according to this invention.
Figure 2:
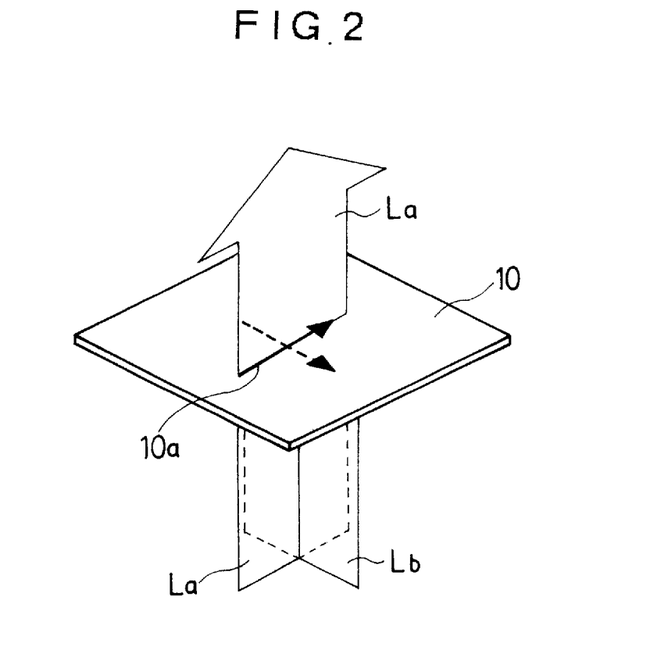
FIG. 2 is an explanatory view for explaining the function of an absorption-type polarizing film of the liquid crystal display device.

At the beginning, the structure of the first embodiment of the liquid crystal display device according to this invention will be explained with reference to FIG. 1 to FIG. 4. FIG. 1 is an exploded perspective view showing the structure of the liquid crystal display device.

This liquid crystal display device 1 is composed of a liquid crystal cell 7, reflection-type polarizing films 8 and 9 disposed respectively on both sides thereof, and absorption-type polarizing films 10 and 11 disposed respectively on its further outside.

Although the illustration of the internal structure of the liquid crystal cell 7 is omitted in this embodiment, it has a liquid crystal layer sealed between a pair of transparent substrates (glass substrates) which have transparent electrodes on the opposed inner surfaces respectively, as that in the liquid crystal cell of the conventional general liquid crystal display device.

A twisted nematic (TN) liquid crystal at a twist angle of 90 degrees is used as the liquid crystal layer. In this case, a linearly polarized light component of an incident light can be optically rotated by 90 degrees through the liquid crystal layer.

The transparent electrodes formed on the opposing inner surfaces of a pair of the substrates are a plurality of display electrodes (pixel electrodes) and opposed electrodes formed with transparent electrode films made of indium tin oxide (ITO) and so on, and by applying voltage between these electrodes, liquid crystal molecules can be risen, and a linearly polarized light component of an incident light is emitted out while maintaining an incident angle without being optically rotated. In other words, by switching the application and the non-application of voltage between these electrodes, a direction of the linearly polarized light of the incident light can be switched between 0-degree and 90-degree.

The absorption-type polarizing films 10 and 11 are general polarizing films made from the stretched film dyed with iodine or dichromatic pigment. As explained with the absorption-type polarizing film 10 in FIG. 2, the absorption-type polarizing films 10 and 11 transmit a linearly polarized light La in a direction parallel to a transmission axis 10a, while absorb a linearly polarized light Lb in a direction orthogonal to the transmission axis 10a (a direction rotated 90 degrees shown as the arrow in broken line).

Figure 3:
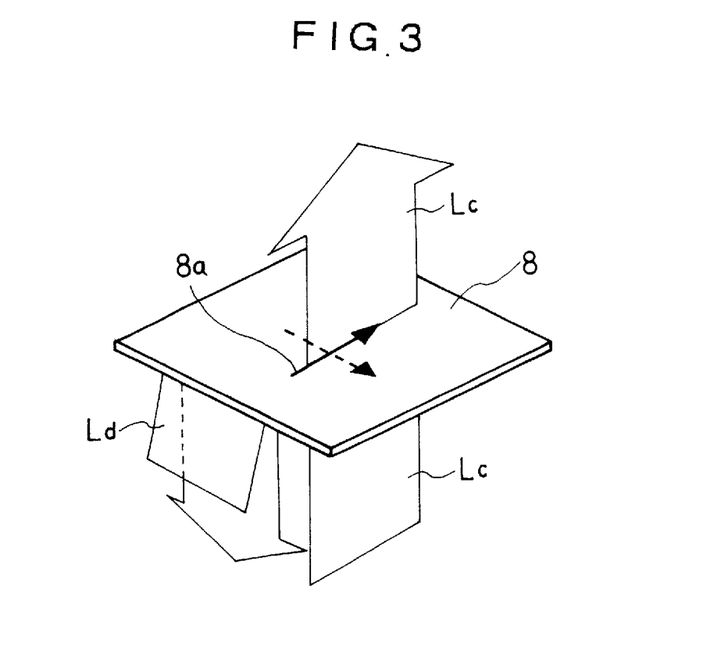
FIG. 3 is an explanatory view for explaining the function of a reflection-type polarizing film of the same.

The reflection-type polarizing films 8 and 9 are sheets having the structure of transparent base films multi-layered with thin films, which transmit a linearly polarized light Lc in a direction parallel to a transmission axis 8a, and reflect a linearly polarized light Ld in a direction orthogonal to the transmission axis 8a (the direction rotated 90 degrees shown as the arrow in broken line) as explained with the reflection-type polarizing film 8 in FIG. 3.

The absorption-type polarizing film 10 and the reflection-type polarizing film 8 disposed on the upper side of the liquid crystal cell 7 and the absorption-type polarizing film 11 and the reflection-type polarizing film 9 disposed on the lower side, which compose the liquid crystal display device 1 shown in FIG. 1, are disposed parallel to each other so that the directions of the transmission axes correspond with each other. In other words, the directions of the transmission axes 10a and 8a almost correspond with each other, and the directions of the transmission axes 11a and 9a almost correspond with each other. Further, in this liquid crystal display device 1, the transmission axes 8a, 10a, 9a and 11a are disposed in the almost same direction.

With the liquid crystal display device 1 having the structure as above, the following display states can be obtained when viewed from a first display surface A and viewed from a second display surface B.

First, when viewed from the first display surface A, since the transmission axis 10a of the absorption-type polarizing film 10 disposed on the first display surface A side is parallel to the transmission axis 8a of the reflection-type polarizing film 8 disposed adjoining to the inside thereof, the linearly polarized light component of the incident light in the direction parallel to both the transmission axes 10a and 8a passes through both of the absorption-type polarizing film 10 and the reflection-type polarizing film 8 to reach the liquid crystal cell 7.

In a portion where no voltage is applied to the liquid crystal cell 7, the direction of the linearly polarized light component is optically rotated 90 degrees by the liquid crystal cell 7 and emitted out. The emitting out light is made incident on the reflection-type polarizing film 9 on the lower side, but it is orthogonal to the transmission axis 11a of the reflection-type polarizing film 9 because the direction of the linearly polarized light component is optically rotated 90 degrees. Therefore, the linearly polarized light component is reflected by the reflection-type polarizing film 9 to return to the visible side. Since this returning reflection light is optically rotated 90 degrees again when passing through the liquid crystal cell 7, the direction of the linearly polarized light component becomes parallel to both of the transmission axis 8a and the transmission axis 10a so that the light passes through both of the reflection-type polarizing film 8 and the absorption-type polarizing film 10 as it is. Thus, the incident light from the first display surface A returns to the first display surface A side so that a white display color can be obtained.

Meanwhile, in a portion where voltage is applied to the liquid crystal cell 7, the linearly polarized light component of the incident light which passed through the absorption-type polarizing film 10 and the reflection-type polarizing film 8 is emitted out as it is without being optically rotated 90 degrees and is made incident on the reflection-type polarizing film 9. Since the direction of the linearly polarized light component of the incident light is parallel to both of the transmission axis 9a and the transmission axis 11a, it passes through both of the reflection-type polarizing film 9 and the absorption-type polarizing film 11 to be emitted out from the second display surface B side. However, since a member for reflecting the light is not disposed outside the second display surface B (back surface), the emitting out light does not return to the first display surface A side. Therefore, a black display state can be obtained.

Thus, a display with excellent contrast (excellent visibility) by black and white-colored display can be obtained.

Next, even when viewed from the second display surface B side, this liquid crystal display device 1 functions in the same way as when viewed from the first display surface A, except for the opposite incident direction of light because it has a symmetrical structure sandwiching the liquid crystal cell 7.

In short, the linearly polarized light component of the incident light from the second display surface B, which is in a direction parallel to the transmission axis 11a of the absorption-type polarizing film 11 and the transmission axis 9a of the reflection-type polarizing film 9, passes through both of the absorption-type polarizing film 11 and the reflection-type polarizing film 9 to reach the liquid crystal cell 7.

In a portion where no voltage is applied to the liquid crystal cell 7, the linearly polarized light component is optically rotated 90 degrees by the liquid crystal cell 7 to be emitted out and made incident on the reflection-type polarizing film 8, where its direction is orthogonal to the transmission axis 8a, thereby reflected by the reflection-type polarizing film 8 to return to the second display surface B side. Since this reflected linearly polarized light is optically rotated 90 degrees again when passing through the liquid crystal cell 7, it becomes parallel to both of the transmission axes 9a and 11a to pass through the reflection-type polarizing film 9 and the absorption-type polarizing film 11 as it is.

Thus, as the linearly polarized light component of the incident light returns to the second display surface B side as it is, the white-colored display state can be obtained in the reflection-type liquid crystal display.

Further, in the portion where voltage is applied to the liquid crystal cell 7, since the linearly polarized light component of the incident light which passed through the absorption-type polarizing film 11 and the reflection-type polarizing film 9 is not optically rotated 90 degrees when passing through the liquid crystal cell 7, it passes through the reflection-type polarizing film 8 and the absorption-type polarizing film 10 as it is and goes out from the first display surface A side. Because the emitting out light does not return to the second display surface B side, black-colored display state can be obtained.

Thus, the display with excellent contrast (excellent visibility) by black- and white-colored display can be obtained.

As described above, the liquid crystal display device 1 in this embodiment can control the reflection and the transmission of the incident light by switching the application and the non-application of voltage to the liquid crystal cell 7. As it functions on the incident light from the first display surface A side and on the incident light from the second display surface B side in the same way, the reflection and the transmission of the incident light can be similarly controlled when viewed from both the display surfaces. Therefore, the first and second display surfaces A and B can equally obtain the black- and white-colored display with excellent visibility and these are displayed in the concurrent way.

Further, the absorption-type polarizing films 10 and 11 are disposed outside of the reflection-type polarizing films 8 and 9 disposed on both sides of the liquid crystal cell 7, where the transmission axes disposed on the same side are set to be parallel to each other. Thus, the incident light from the first display surface A or the second display surface B can be made incident on the reflection-type polarizing films 8 and 9 after its linearly polarized light component which is reflected when made incident on the reflection-type polarizing films 8 and 9 are cut in advance by the absorption-type polarizing films 10 and 11.

Therefore, the light made incident from the visible side and returned back to the visible side and the light made incident from the opposite side and emitted out are distinguished clearly and the display with excellent contrast can be obtained. Further, enough reflection light can be obtained without a back light so that the display performance as of the conventional reflection-type liquid crystal display device which has a display only on one side can be obtained on both surfaces.

Figure 4:
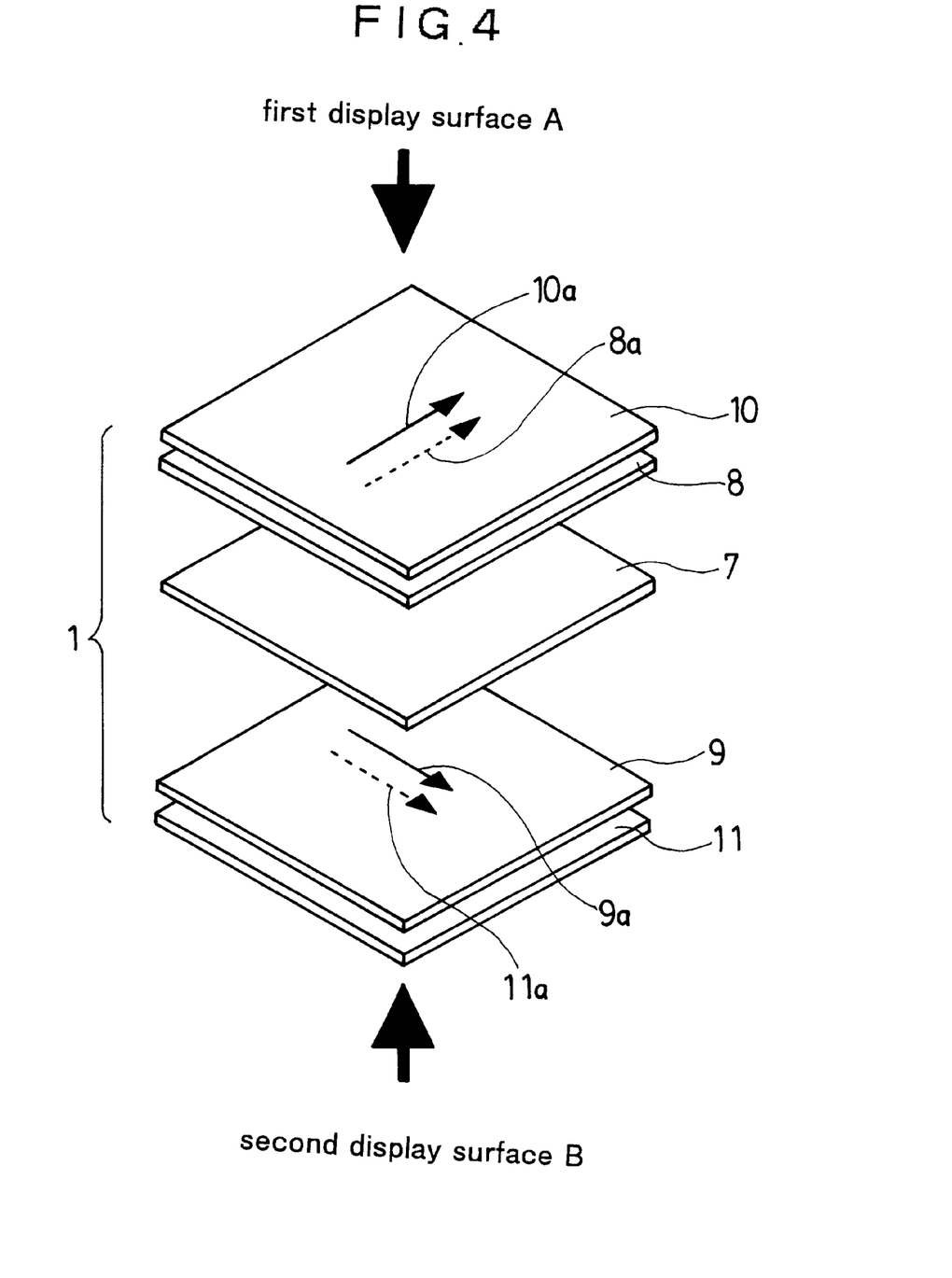
FIG. 4 is an exploded perspective view showing the structure of the first embodiment of the liquid crystal display device, in which the arrangement of the absorption-type polarizing film and the reflection-type polarizing film are different.

Part of this liquid crystal display device 1 may be changed to dispose the absorption-type polarizing film 10 and the reflection-type polarizing film 8, as well as the absorption-type polarizing film 11 and the reflection-type polarizing film 9 in such a manner to direct each of the transmission axes 10a and 8a, 11a and 9a orthogonally as shown in FIG. 4. Thus, the same display can be obtained except for the reversal of the black- and white-colored display in the portions where voltage is applied and not applied to the liquid crystal cell 7.

Note that an STN (super twisted nematic) liquid crystal at a twist angle of 180 degrees to 270 degrees can be used as the liquid crystal layer sealed in the liquid crystal cell 7, instead of the above-described TN liquid crystal at a twist angle of 90 degrees. Though the embodiment using the STN liquid crystal will be explained later in detail, the STN liquid crystal is effective in obtaining a display with high contrast by high-split simple matrix drive. As described above, the TN liquid crystal is advantageous with respect to the manufacturing cost and the material cost when lowly split, and to the enough contrast obtained for use when split into 2 to 16. Alternatively, a ferroelectric liquid crystal may be used as the liquid crystal layer sealed in the liquid crystal cell 7.

Second Embodiment: FIG. 5 to FIG. 8

Next, the second embodiment according to the present invention will be explained with reference to FIG. 5 to FIG. 8.

Figure 5:
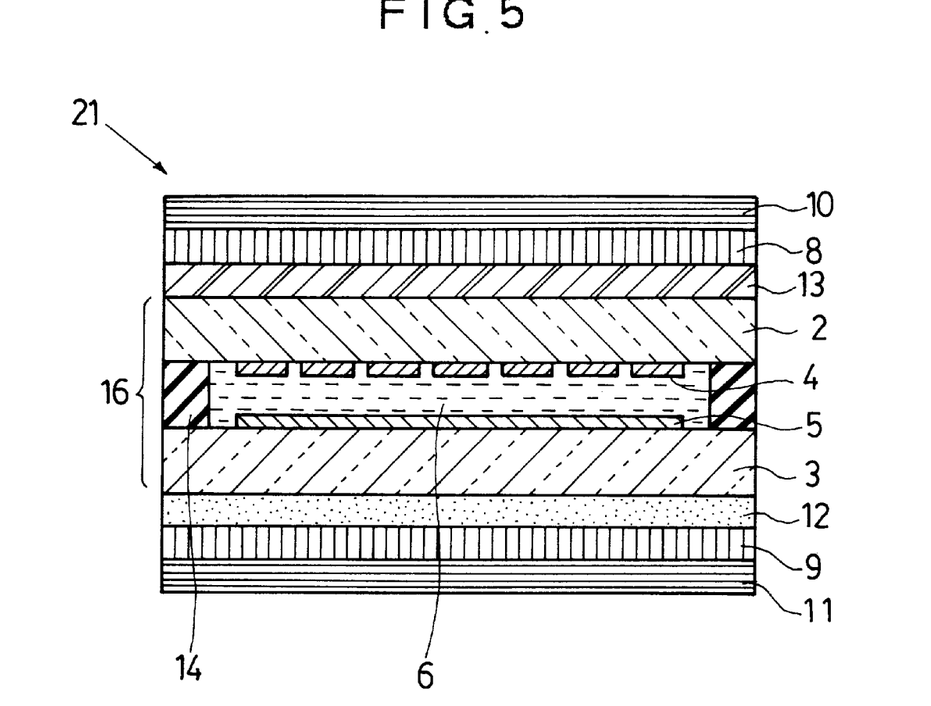
FIG. 5 is a sectional view schematically showing the structure of a second embodiment of a liquid crystal display device according to this invention.

As shown in FIG. 5, a liquid crystal display device 21 based on the second embodiment is composed of an STN liquid crystal cell 16, a retardation film 13 or a light scattering member 12 disposed on both sides thereof, sandwiched by reflection-type polarizing films 8 and 9, and absorption-type polarizing films 10 and 11 disposed on its further outside.

When compared, the only differences of this liquid crystal display device 21 from the liquid crystal display device 1 in the first embodiment are that a liquid crystal layer is an STN liquid crystal cell 16, and that the light scattering member 12 and the retardation film 13 are disposed.

In the STN liquid crystal cell 16, a plurality of transparent electrodes 4 and transparent electrodes 5 made of ITO are formed on each side of the inner surfaces opposed to each other of a transparent glass substrate 2 having a thickness of about 0.7 mm and a transparent glass substrate 3 having a thickness of about 0.7 mm similarly, and the liquid crystal layer 6 of a super twisted nematic liquid crystal (STN liquid crystal) which is aligned at a twist angle of 240 degrees is sealed by a sealant 14 between the pair of glass substrates 2 and 3.

Moreover, alignment layers (not shown) are formed on each of surfaces of the glass substrate 2 and the transparent electrode 4, as well as the glass substrate 3 and the transparent electrode 5, and the alignment treatment of each alignment layer as described below makes the liquid crystal layer 6 into the STN liquid crystal layer which is aligned at a twist angle of 240 degrees to the left.

Figure 6:
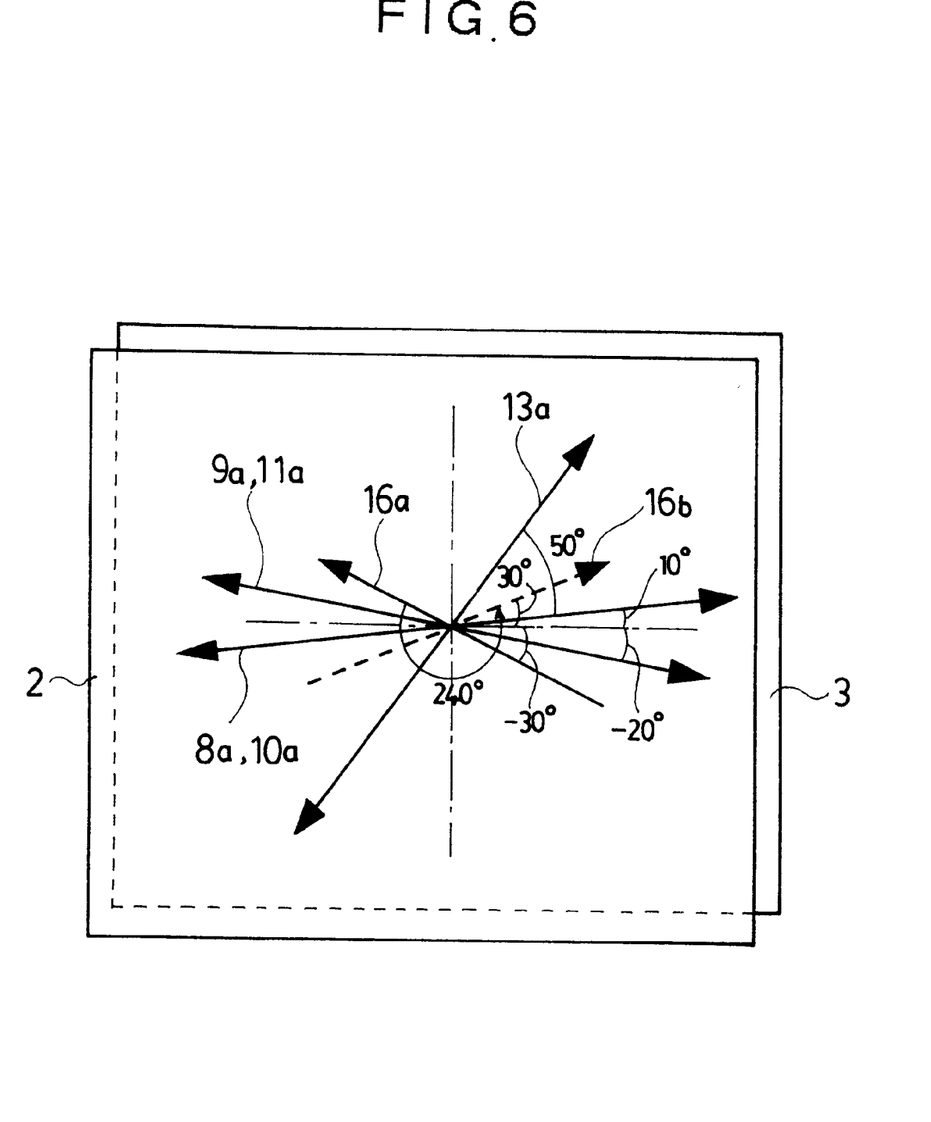
FIG. 6 is an explanatory view showing the plane positional relations between respective members composing the liquid crystal display device shown in FIG. 5.

The glass substrate 2 and the transparent electrodes 4 are subjected to the rubbing treatment at a −30-degree angle in the upward to the left direction with respect to a horizontal axis ("−" represents a rotating angle in a clockwise direction), whereby an upper molecular alignment direction of liquid crystal 16a of the glass substrate 2 side of the liquid crystal layer 6 is disposed at a −30-degree angle in the upward to the left direction as shown in FIG. 6. Further, the glass substrate 3 and the transparent electrodes 5 are subjected to the rubbing treatment at a 30-degree angle in the upward to the right direction, whereby a lower molecular alignment direction of liquid crystal 16b of the liquid crystal layer 6 is disposed at a 30-degree angle in the upward to the right direction. Thus, the STN liquid crystal layer which is aligned at a twist angle of 240 degrees in a counterclockwise direction (to the left) is formed.

Further, a difference Δn in birefringence of the nematic liquid crystal used in the liquid crystal layer 6 is set to be 0.148 and a cell gap d which is a gap between the glass substrate 2 and the glass substrate 3 is set to be 5.45 μm. Accordingly, Δnd value of the liquid crystal layer 6, represented by the product of the difference Δn in the birefringence of the nematic liquid crystal and the cell gap d is set to be 807 nm.

The retardation film 13 of the STN liquid crystal cell 16 like this is disposed outside the glass substrate 2 so that its phase delay axis 13a is directed at a 50-degree angle with respect to a horizontal axis. Further, the reflection-type polarizing film 8 is disposed outside the retardation film 13 so that the transmission axis 8a thereof is directed at a 10-degree angle with respect to a horizontal axis, and the reflection-type polarizing film 10 is disposed outside the reflection-type polarizing film 8 so that the transmission axis 10a thereof is directed at a 10-degree angle with respect to a horizontal axis.

Moreover, the light scattering member 12 is disposed outside the glass substrate 3 of the STN liquid crystal cell 16.

On its outside, the reflection-type polarizing film 9 is disposed so that the transmission axis 9a thereof is directed at a −20-degrees angle with respect to a horizontal axis, and the absorption-type polarizing film 11 is disposed outside the reflection-type polarizing film 9 so that the transmission axis 11a thereof is directed at a −20-degree angle with respect to a horizontal axis.

The STN liquid crystal cell 16 and the retardation film 13 are attached to each other by using an acrylic adhesive (not shown). The reflection-type polarizing film 8 and the absorption-type polarizing film 10 are also attached to each other by using an acrylic adhesive (not shown).

Further, the reflection-type polarizing film 9 is attached to the STN liquid crystal cell 16 by using an adhesive, and the absorption-type polarizing film 11 is attached by using an acrylic adhesive (not shown). Incidentally, the adhesive may serve as the light scattering member 12.

The retardation value of the retardation film 13 is set to be 580 nm. In order to improve the viewing angle characteristics, this retardation film 13 uses a biaxial retardation film, which is set to be nx>nz>ny, where the refractive index in the phase delay axis direction is nx, the refractive index in the y axis direction is ny, and the refractive index in a thickness direction is nz. Of course a uniaxial retardation film can be used.

D-BEF (trade name) manufactured by Sumitomo 3M Ltd. is used as the reflection-type polarizing film 8 in this second embodiment. This D-BEF is generally used to improve the brightness of the back light, however it functions well enough to be used as the reflection-type polarizing film as in this second embodiment.

R-DEFC (trade name) manufactured by Sumitomo 3M Ltd. is used as the reflection-type polarizing film 9 and the light scattering member 12. R-EFC is made from the reflection-type polarizing film applied with an adhesive with scatterer, and the adhesive serves as the light scattering member 12. Incidentally, the opposite surface of the reflection-type polarizing film 9 to that applied with the adhesive is the surface of the reflection-type polarizing film as it is. There is R-DEF (trade name), but the black-colored non-transmission film is formed on the surface opposite to that applied with the adhesive. In this embodiment, R-DEFC without the formation of the black-colored non-transmission film is used.

Next, the function of this liquid crystal display device 21 will be explained specifically when viewed from the first display surface A side and from the second display surface B side.

When viewed from the first display surface A side, in the portion where no voltage is applied to the liquid crystal layer 6, the linearly polarized light component of the incident light from the first display surface A side, which is in the direction orthogonal to the transmission axis 10a as shown in FIG. 6 is absorbed by the absorption-type polarizing film 10, while the linearly polarized light component in the direction parallel to the transmission axis 10a is transmitted to be made incident on the reflection-type polarizing film 8. Thus-incident linearly polarized light component passes through the reflection-type polarizing film 8 as its direction is parallel to the direction of the transmission axis 8a of the reflection-type polarizing film 8, and further passes through the retardation film 13 to be made incident on the STN liquid crystal cell 16.

Supposing that the retardation film 13 is not disposed, the light passes through the STN liquid crystal cell 16 to become an elliptic polarized state, which is not reflected by the reflection-type polarizing film 8 completely. Further, the display is unsatisfactory because it is colored by birefringence. However, this liquid crystal display device 21 can obtain a clear display as follows since the retardation film 13 is disposed between the reflection-type polarizing film 9 and the STN liquid crystal cell 16.

The linearly polarized light emitted out from the reflection-type polarizing film 8 is made incident on the retardation film 13 to become the elliptic polarized state and then it is made incident on the STN liquid crystal cell 16. The elliptically polarized light is corrected to become the almost linearly polarized light during its transmission through the STN liquid crystal cell 16, which is rotated about a 60-degree angle with respect to the transmission axis 8a of the reflection-type polarizing film 8, and emitted out with its direction of a 70-degree angle with respect to a horizontal axis. The emitted-out linearly polarized light component is moderately scattered by the light scattering member 12 to be made incident on the reflection-type polarizing film 9.

Figure 7:
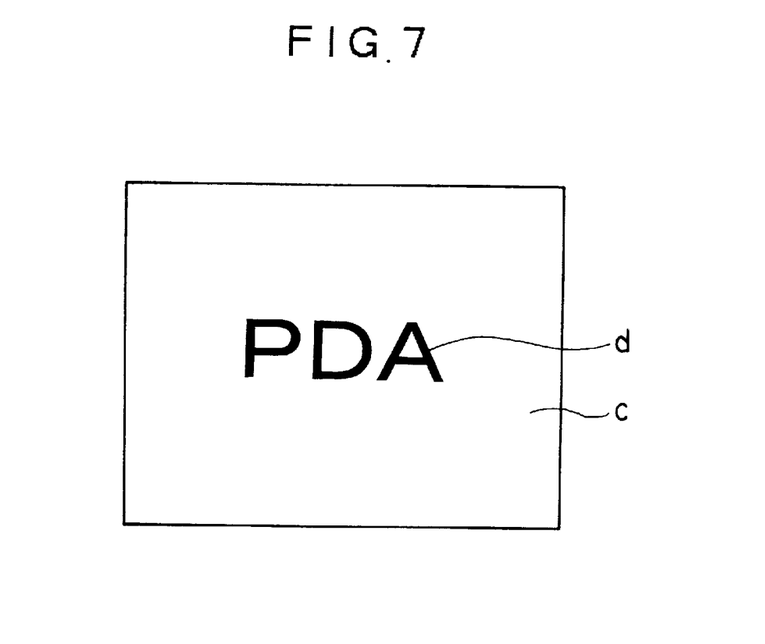
FIG. 7 is an explanatory view showing a state in which characters are displayed on the liquid crystal display device shown in FIG. 5.

The transmission axis 9a of the reflection-type polarizing film 9 is directed at a −20-degree angle with respect to a horizontal axis, as shown in FIG. 6. Therefore, since the linearly polarized light made incident on the reflection-type polarizing film 9 is in the direction orthogonal to the transmission axis 9a of the reflection-type polarizing film 9, it is reflected by the reflection-type polarizing film 9 to return to the first display surface A side. Since the reflection light passes through the light scattering member 12 again when returning, the linearly polarized light scattered moderately is emitted out from the first display surface A. Therefore, it is viewed as a white-colored display like a display c as shown in FIG. 7, which is the portions where no voltage is applied and all lights are reflected.

On the other hand, in the portion where voltage is applied to the transparent electrodes 4 and the transparent electrodes 5 of the STN liquid crystal cell 16, the molecules of the nematic liquid crystal of the liquid crystal layer 6 rise to change the birefringence of the STN liquid crystal cell 16. Then, the direction of the emitting-out linearly polarized light component from the STN liquid crystal cell 16 is optically rotated about a 90-degree angle, and is emitted out in the direction of a −20-degree angle with respect to a horizontal axis. This linearly polarized light component passes through the reflection-type polarizing film 9 and the absorption-type polarizing film 11 as it is and goes out from the second display surface B since its direction is parallel to the transmission axes 9a and 11a, but it is not reflected to return to the first display surface A side because no member for reflection is disposed outside the second display surface B. Therefore, a black-colored display can be obtained like a display d as shown in FIG. 7, which is the portions where voltage is applied.

Thus, this liquid crystal display device 21 can obtain a clear display with excellent contrast of black and white colors by disposing the retardation film 13 between the reflection-type polarizing film 8 and the STN liquid crystal cell 16.

Meanwhile, when viewed from the second display surface B side, compared with when viewed from the first display surface A side, the differences are that the position of the light scattering member 12 which is disposed before/after the light is made incident on the STN liquid crystal cell 16, and the position of the retardation film 13 which is disposed before/after the light is made incident on the STN liquid crystal cell 16, and these displays are as follows.

When voltage is not applied, the linearly polarized light component of the incident light from the second display surface B side, which is in the direction orthogonal to the transmission axis 11a of the absorption-type polarizing film 11 is absorbed, while the linearly polarized light component in the direction parallel thereto is transmitted to be made incident on the reflection-type polarizing film 9. This linearly polarized light component passes through the reflection-type polarizing film 9 as its direction is parallel to the direction of the transmission axis 9a of the reflection-type polarizing film 9, and is made incident on the STN liquid crystal cell 16 after scattered by the light scattering member 12. When emitted out from the STN liquid crystal cell 16, the linearly polarized light becomes to be the elliptic polarized light state, which is corrected to become the almost linearly polarized light during its transmission through the retardation film 13, which is optically rotated about a −60-degree angle with respect to the transmission axis 9a of the reflection-type polarizing film 9, and emitted out with its direction of a −80-degree angle with respect to a horizontal axis.

The emitted-out linearly polarized light component is made incident on the reflection-type polarizing film 8. The transmission axis 8a of the reflection-type polarizing film 8 is directed at a 10-degree angle with respect to a horizontal axis, as shown in FIG. 6. Therefore, since the incident linearly polarized light component is made incident in the direction orthogonal to the transmission axis 8a, it is reflected by the reflection-type polarizing film 8 to return to the second display surface B side. Since the reflection light passes through the light scattering member 12 again when returning, the linearly polarized light scattered moderately is emitted out from the second display surface B and thus, it is viewed as a white-colored display.

On the other hand, in the portion where voltage is applied to the STN liquid crystal cell 16, the molecules of the nematic liquid crystal rise to change the birefringence of the STN liquid crystal cell 16, wherein the linearly polarized light component is optically rotated about a 90-degree angle and directed at a 10-degree angle with respect to a horizontal axis.

Therefore, this linearly polarized light component passes through the reflection-type polarizing film 8 since it is incident from the direction parallel to the transmission axis 8a of the reflection-type polarizing film 8 and further passes through the absorption-type polarizing film 10 and goes out from the first display surface A. However, the reflection light is not reflected to return to the second display surface B side, since no member for reflection is disposed outside the first display surface A. Thus, a black-colored display can be obtained.

Thus, the black- and white-colored display can be obtained by the application and the non-application of voltage to the STN liquid crystal cell 16, and the clear display with excellent contrast of black and white colors can be obtained when viewed from both of the first display surface A and the second display surface B.

Further, the liquid crystal display device 21 becomes to have sharp responsivity in deformation of the nematic liquid crystal molecules in response to the applied voltage by using the STN liquid crystal cell 16, whereby the increased sharp responsivity of optical characteristic is obtained. Therefore, the number of the scanning lines of the simple matrix drive can be increased to 100–400 so that a large-sized liquid crystal display device and a high density liquid crystal display device can be provided. Further, the viewing angle characteristics are also improved.

Thus, this liquid crystal display device 21 can display information on its both surfaces, which can be viewed from both sides, and what is more, it is the liquid crystal display device with high contrast and excellent viewing angle characteristics.

Figure 8:
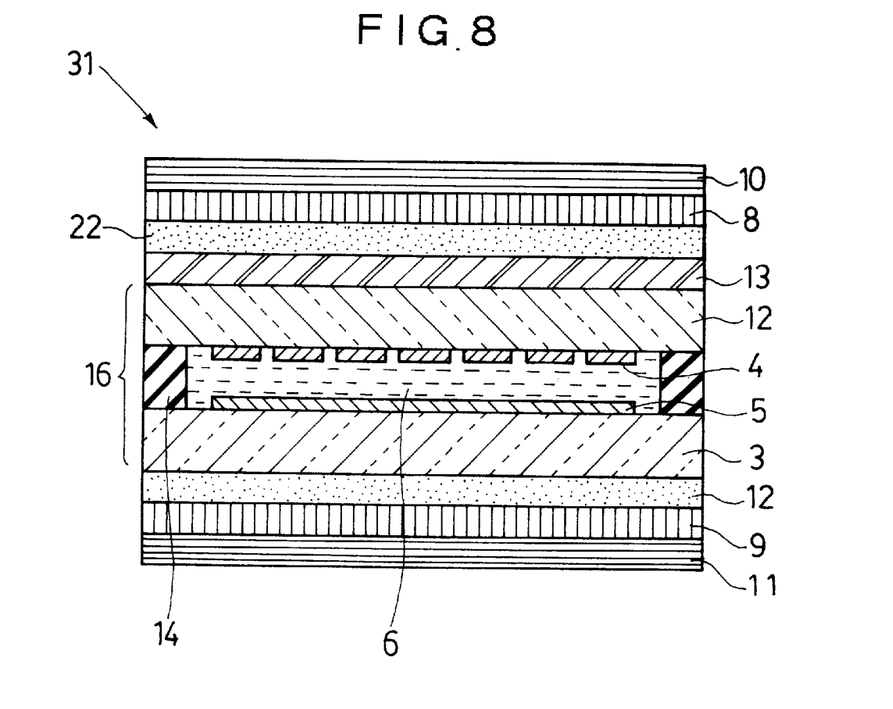
FIG. 8 is a sectional view showing the structure of a third embodiment of a liquid crystal display device according to this invention.

Part of this liquid crystal display device 21 may be changed to be that as shown in FIG. 8. When compared, a liquid crystal display device 31 as shown in FIG. 8 is the same with the liquid crystal display device 21 except for a light scattering member 22 is disposed, besides the light scattering member 12, between the reflection-type polarizing film 8 and the retardation film 13.

R-DEFC (trade name) manufactured by Sumitomo 3M Ltd. is preferably used as the reflection-type polarizing film 8 and the light scattering member 22 in the liquid crystal display device 31. R-DEFC is made from the reflection-type polarizing film applied with an adhesive doubled as a scatterer, which has both the functions of the light scattering member and the reflection-type polarizing film. Similarly, as the reflection-type polarizing film 9 and the light scattering member 12, R-DEFC is preferably used. Thus-manufactured, low cost and high mass-productivity are achieved because the same member can be used as the reflection-type polarizing film 8 and the reflection-type polarizing film 9.

Since positional relations of the transmission axes of the polarizing films of this liquid crystal display device 31 are the same as those of the liquid crystal display device 21, it displays information on both surfaces in black and white colors, which can be viewed from both sides, as the liquid crystal display device 21. The difference in the display state is that the difference in the scattering state of light is lessened between when viewed from the first display surface A side and from the second display surface B side because the light scattering member 22 is added.

The super twisted nematic liquid crystal at a twist angle of 240 degrees is used as the liquid crystal layer of the STN liquid crystal cell 16, but the super twisted nematic liquid crystal at a twist angle of 180 degrees to 270 degrees may be used. Alternatively, a ferroelectric liquid crystal may be used as the liquid crystal layer sealed in the liquid crystal cell 7.

Further, one retardation film 13 is disposed to correct the elliptic polarized light state of the STN liquid crystal cell 16 to the linearly polarized light in both of the above-described liquid crystal display device 31 and liquid crystal display device 21, but when several retardation films are employed, the linearly polarized light is more fully corrected to obtain the display with increased contrast. In this case, several retardation films can be disposed either on one side or on both sides of the STN liquid crystal cell 16.

Moreover, R-DEFC made from the reflection-type polarizing film applied with an adhesive is used in both of the liquid crystal display device 31 and the liquid crystal display device 21 as the light scattering members 12 and 22, but a diffusing sheet made from a polycarbonate film applied with the material of an adhesive mixed with acrylic beads to provide a diffusion layer or an embossing processed film may be used as the light scattering members 12 and 22.

Further, the embossing processed reflection-type polarizing film may be used as the reflection-type polarizing films 8 and 9, which is preferable because the light scattering members are not needed to be disposed separately as thus-prepared reflection-type polarizing films 8, 9 serve as the light scattering films 22, 12. In both cases, it is preferable to have a haze value of 30 or more as the light scattering functions. Further, it is preferable to have a light transmittance of 80% or more.

The light scattering members 12, 22 are used in the above-mentioned second embodiment, but the light scattering members 12, 22 can be removed depending on its purposes, as they are used to scatter the reflection light from the reflection-type polarizing film so as to obtain the white-colored display. Since the reflection light by the above-mentioned D-BEF (trade name) manufactured by Sumitomo 3M Ltd. has luster, the display in a metallic tone can be obtained.

Therefore, it is preferable not to dispose the light scattering member in order to obtain, for example, the display in a metallic tone. When the light scattering member is not disposed, there is no problem in the performance of the liquid crystal display device, which can be viewed from both the surfaces while the white-color of the display becomes metallic-color.

What is claimed is:

1. A liquid crystal display device comprising:

a liquid crystal cell formed by sealing a liquid crystal layer between a pair of transparent substrates having electrodes on the opposed inner surfaces respectively;

reflection-type polarizing films respectively disposed on both sides of the liquid crystal cell for transmitting a linearly polarized light in a direction parallel to a transmission axis and reflecting a linearly polarized light in a direction orthogonal to the transmission axis; and absorption-type polarizing films respectively disposed outside said reflection-type polarizing films for transmitting a linearly polarized light in a direction parallel to a transmission axis and absorbing a linearly polarized light in a direction orthogonal to the transmission axis.

2. The liquid crystal display device according to claim 1, wherein said reflection-type polarizing film and said absorption-type polarizing film which are disposed on the same side of said liquid crystal cell are disposed so that the directions of these transmission axes almost correspond with each other.

3. The liquid crystal display device according to claim 1, wherein at least one light scattering member is disposed between said liquid crystal cell and said reflection-type polarizing film on one side and between said liquid crystal cell and said reflection-type polarizing film on the other side.

4. The liquid crystal display device according to claim 2, wherein at least one light scattering member is disposed between said liquid crystal cell and said reflection-type polarizing film on one side and between said liquid crystal cell and said reflection-type polarizing film on the other side.

5. The liquid crystal display device according to claim 1, wherein the liquid crystal layer of said liquid crystal cell is made of a super twisted nematic liquid crystal.

6. The liquid crystal display device according to claim 4, wherein the liquid crystal layer of said liquid crystal cell is made of a super twisted nematic liquid crystal.

7. The liquid crystal display device according to claim 1, wherein the liquid crystal layer of said liquid crystal cell is made of the super twisted nematic liquid crystal, and a retardation film is disposed on one surface side of said liquid crystal cell.

8. The liquid crystal display device according to claim 4, wherein the liquid crystal layer of said liquid crystal cell is made of the super twisted nematic liquid crystal, and a retardation film is disposed on one surface side of said liquid crystal cell.

9. The liquid crystal display device according to claim 1, wherein the liquid crystal layer of said liquid crystal cell is made of a twisted nematic liquid crystal.

10. The liquid crystal display device according to claim 4, wherein the liquid crystal layer of said liquid crystal cell is made of a twisted nematic liquid crystal.

11. The liquid crystal display device according to claim 1, wherein the liquid crystal layer of said liquid crystal cell is made of a ferroelectric liquid crystal.

12. The liquid crystal display device according to claim 4, wherein the liquid crystal layer of said liquid crystal cell is made of a ferroelectric liquid crystal.

* * * * *